UNITED STATES PATENT OFFICE.

EMIL PORTHEIM, OF PRAGUE, REPUBLIC OF CZECHO-SLOVAKIA, ASSIGNOR TO THE FIRM OF KINZLBERGER & CO., OF PRAGUE, CZECHO-SLOVAKIA REPUBLIC.

PROCESS FOR THE PURIFICATION OF ANTHRAQUINONE.

1,404,056.  Specification of Letters Patent.  Patented Jan. 17, 1922.

No Drawing.  Application filed August 19, 1920.  Serial No. 404,706.

*To all whom it may concern:*

Be it known that I, EMIL PORTHEIM, manufacturer, a citizen of the Republic of Czecho-Slovakia, and residing at Prague, in the Republic of Czecho-Slovakia, have invented certain new and useful Improvements in a Process for the Purification of Anthraquinone, of which the following is a specification.

It has been discovered that it is possible to purify anthraquinone perfectly in a single operation without loss. It is only necessary to treat the crude anthraquinone dissolved in a neutral solvent, with the purifying agent. As such purifying agent there may be employed on the one hand alkaline substances, such as caustic alkalies, alkaline carbonates (e. g. carbonates of the alkali metals) calcium hydroxide and the like, which can be used in aqueous solution, and on the other hand sulphuric acid, which can be employed concentrated or moderately diluted. The impurities pass over into the alkali or the sulphuric acid, and the solution is left pure.

*Example 1.*—25 parts by weight of crude anthraquinone containing 91.5 per cent of anthraquinone are boiled with 250 parts by volume of chlorobenzene and 10 parts by volume of a 1:1 solution of caustic alkali, the mixture being well stirred. The chlorobenzene and water distil off slowly. The solution becomes gradually purer. The boiling is interrupted when a sample of the solution, mixed with some finely powdered caustic soda and boiled, no longer darkens the color of the latter. Should the dark coloration still take place to a slight degree and longer boiling not lead to the desired result, some potash lye should be added; in most cases however the quantity specified is sufficient. The solution is withdrawn, the anthraquinone that is precipitated after the cooling is drawn off and the chlorobenzene is removed by means of steam and dried. The anthraquinone is perfectly pure.

*Example 2.*—25 parts by weight of crude anthraquinone containing 90 per cent of anthraquinone, 450 parts by volume of coal tar naphtha boiling at 126 to 130 degrees C., and 10 parts by volume of a 1:1 caustic potash solution are treated as in Example 1.

*Example 3.*—25 parts by weight of crude anthraquinone as above, 250 parts by volume of chlorobenzene and 30 parts by weight of sulphuric acid of 60 degrees Bé. are boiled, until no further purification takes place. The subsequent treatment takes place as in Example 1. The anthraquinone is of 99.5 per cent strength.

What I claim is:

1. A process for the purification of anthraquinone consisting in dissolving the impure anthraquinone in a neutral solvent, adding an agent which forms an insoluble precipitate with the impurities, and separating this precipitate from the solution.

2. A process for the purification of anthraquinone consisting in dissolving impure anthraquinone in a neutral solvent, adding an agent which forms an insoluble precipitate with the impurities, and purifying and separating this precipitate from the solution.

3. A process for the purification of anthraquinone consisting in dissolving the impure anthraquinone, adding an alkali agent which forms an insoluble precipitate, and separating this precipitate from the solution.

4. A process for the purification of anthraquinone consisting in boiling the impure anthraquinone in the solution with chlorobenzene and an alkali, and separating the precipitate formed from the solution.

In testimony whereof I have hereunto set my hand in presence of two subscribing witnesses.

EMIL PORTHEIM.

Witnesses:
 RYDER FOS,
 J. E. CALLAHAN.